United States Patent
Watanabe et al.

(10) Patent No.: US 6,368,721 B1
(45) Date of Patent: Apr. 9, 2002

(54) LAMINATED FILM

(75) Inventors: Jun Watanabe; Satoshi Akiyama; Yoshikuni Souma, all of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/276,447

(22) Filed: Mar. 25, 1999

(30) Foreign Application Priority Data

Mar. 26, 1998 (JP) .............................................. 10-79110

(51) Int. Cl.$^7$ .............................................. B32B 15/08
(52) U.S. Cl. ........................ 428/461; 428/457; 428/464
(58) Field of Search ................................. 428/457, 461

(56) References Cited

U.S. PATENT DOCUMENTS

| | | | | |
|---|---|---|---|---|
| 5,321,106 A | | 6/1994 | LaPointe .................... | 526/126 |
| 5,587,247 A | * | 12/1996 | Kubo et al. .................. | 428/523 |
| 5,885,707 A | * | 3/1999 | Kashel et al. ................ | 428/349 |
| 6,183,863 B1 | * | 2/2001 | Kawachi et al. ............. | 428/355 |

FOREIGN PATENT DOCUMENTS

| | | |
|---|---|---|
| EP | 0572034 A2 | 12/1993 |
| EP | 0764679 A1 | 3/1997 |
| JP | 02276807 A | 11/1990 |
| JP | 06009724 A | 1/1994 |
| JP | 06136195 A | 5/1994 |
| JP | 06136196 A | 5/1994 |
| JP | 06207057 A | 7/1994 |
| JP | 10000745 | 1/1998 |
| WO | 9414855 A1 | 7/1994 |

\* cited by examiner

*Primary Examiner*—Paul Thibodeau
*Assistant Examiner*—Monique R Jackson
(74) *Attorney, Agent, or Firm*—Birch, Stewart, Kolasch & Birch, LLP

(57) ABSTRACT

A laminated film comprises at least an aluminum layer and, superimposed on one side thereof by extrusion lamination, a linear low-density polyethylene layer, this linear low-density polyethylene layer prepared with the use of a metallocene olefin polymerization catalyst and having a density of 0.895 to 0.930 g/cm$^3$ and an MFR (190° C.) of 0.1 to 100 g/10 min, wherein the linear low-density polyethylene layer at its surface exhibits an oxygen concentration of linear low-density polyethylene per se ranging from 1.0 to 1.4 atomic %. The laminated film which has an excellent balance of aluminum bond strength and heat sealing properties of linear low-density polyethylene layers and it can be provided at low cost. Further, a laminated film comprising at least the linear low-density polyethylene layer, the aluminum layer and a substrate layer arranged in this order can be provided at low cost by adding a layer or layers to the laminated film obtained by the extrusion lamination. This laminated film is suitable to, for example, a packaging material for dry food.

10 Claims, No Drawings

LAMINATED FILM

FIELD OF THE INVENTION

The present invention relates to a laminated film which is used in packaging of dry foods or medicines, etc.

BACKGROUND OF THE INVENTION

Dry foods, for example, snacks such as potato chips, sweet stuffs such as biscuits, rice crackers and chocolate, and powder soup, when having absorbed moisture, exhibit poor palatability at the eating thereof. In particular, dry foods containing much oil, such as potato chips, when exposed to oxygen gas, has their oil component denatured. Therefore, it is commonly required that the packaging materials for these dry foods have excellent moistureproofing and oxygen gas barrier properties. Further, stricter requirements are imposed on the packaging materials for medicines because of the need to prevent the denaturation thereof by moisture absorption or gas. As a typical example of these packaging materials, use is made of a laminated film formed by extrusion lamination which consists of a surface substrate layer composed of, for example, a polyamide resin, a polyethylene terephthalate resin or paper, a polyethylene layer composed principally of a high-pressure-processed low-density polyethylene and a sealant layer composed of an aluminum foil or an acid copolymer such as ethylene/methacrylic acid copolymer (EMAA) or an ionomer.

The acid copolymer such as EMAA or an ionomer has the property of being excellent in adherence to aluminum foils, not possessed by the conventional high-pressure-processed low-density polyethylene, so that it is often employed in the above use. However, the acid copolymer is expensive and has an odor problem. Furthermore, when the acid copolymer is employed in the production of the above laminated film by extrusion lamination, satisfactory purging is required in the resin change to another such as the high-pressure-processed low-density polyethylene to thereby cause a problem of much resin loss.

For solving the above problems of the prior art, the inventors have selected the use of a linear low-density polyethylene (M-LLDPE) prepared with the use of a metallocene olefin polymerization catalyst, in place of the acid copolymer such as EMAA or an ionomer, as the sealant resin and have studied the adherence of M-LLDPE layer to aluminum foil and the heat sealing properties of M-LLDPE layers. Taking into account that, in actual packaging, the bond strength between sealant layers is occasionally regarded as being more important than the bond strength between sealant layer and aluminum layer, the inventors have found a laminated film which has a desirable balance of heat sealing properties and aluminum bond strength, thus, has an excellent quality as a dry food packaging material. The present invention has been completed on the basis of this finding.

OBJECT OF THE INVENTION

The object of the present invention is to provide a laminated film formed by extrusion lamination, which comprises an aluminum layer composed of an aluminum foil or an aluminum vapor deposition film and a linear low-density polyethylene layer prepared with the use of a metallocene olefin polymerization catalyst, thereby having a desirable balance of aluminum bond strength and heat sealing properties of linear low-density polyethylene layers, and further to provide a laminated film of multilayer structure having at least three layers including these.

SUMMARY OF THE INVENTION

The laminated film of the present invention comprises at least an aluminum layer (A) and, superimposed on one side thereof by extrusion lamination, a linear low-density polyethylene layer (B), this linear low-density polyethylene layer (B) prepared with the use of a metallocene olefin polymerization catalyst and having (i) a density (d; measured in accordance with ASTM D 1505) of 0.895 to 0.930 g/cm$^3$ and (ii) a melt flow rate (MFR; measured at 190° C. under a load of 2.16 kg in accordance with ASTM D 1238) of 0.1 to 100 g/10 min, wherein the linear low-density polyethylene layer (B) at its surface exhibits an oxygen concentration of linear low-density polyethylene per se ranging from 1.0 to 1.4 atomic %.

In the laminated film of the present invention, a substrate layer (C) may further be superimposed on the opposite side of the aluminum layer (A) remote from the linear low-density polyethylene layer (B).

Also, in the laminated film of the present invention, a polyethylene layer (D) and a substrate layer (C) in this order may further be superimposed on the opposite side of the aluminum layer (A) remote from the linear low-density polyethylene layer (B).

Moreover, in the laminated film of the present invention, a first polyethylene layer (D) and a substrate layer (C) in this order may further be superimposed on the opposite side of the aluminum layer (A) remote from the linear low-density polyethylene layer (B) and a second polyethylene layer (D) may further be superimposed on the linear low-density polyethylene layer (B).

Still moreover, in the laminated film of the present invention, a first substrate layer (C), a polyethylene layer (D) and a second substrate layer (C) in this order may further be superimposed on the opposite side of the aluminum layer (A) remote from the linear low-density polyethylene layer (B).

When a linear low-density polyethylene having a desirable balance of melt tension and fluidity and having an excellent moldability is needed as one for go use in the formation of the linear low-density polyethylene layer (B), preferred use is made of a copolymer of ethylene and an α-olefin which is:

a copolymer of ethylene and an α-olefin having 4 to 20 carbon atoms having:
(i) a density (d) ranging from 0.895 to 0.930 g/cm$^3$;
(ii) a melt flow rate (MFR), measured at 190° C. under a load of 2.16 kg, ranging from 0.1 to 100 g/10 min;
(iii) a melt flow rate (MFR, g/10 min) and a melt tension (MT, g) measured at 190° C., which satisfy the relationship:

$$MT > 2.0 \times MFR^{-0.84};$$

(iv) a fluidity index (FI, 1/sec) defined as a shearing rate exhibited when the shearing stress of molten polymer at 190° C. has reached 2.4×10$^6$ dyne/cm$^2$, the fluidity index and the melt flow rate (MFR, g/10 min) satisfying the relationship:

$$FI > 75 \times MFR;$$

(v) a n-decane soluble content (W, wt. %) measured at 23° C., the n-decane soluble content and the density (d, g/cm$^3$) satisfying the relationship:

when $MFR < 10$ g/10 min, $$W < 80 \times \exp(-100(d-0.88)) + 0.1,$$

and when $MFR \leqq 10$ g/10 min, $$W<80\times(MFR-9)^{0.26}\times\exp(-100(d-0.88))+0.1;$$

and (vi) a temperature exhibited at the maximum peak of endothermic curve obtained by a differential scanning calorimeter (Tm, ° C.), the temperature and the density (d, g/cm³) satisfying the relationship:

$$Tm<400d-250.$$

DETAILED DESCRIPTION OF THE INVENTION

The laminated film of the present invention will be described in detail below.

The laminated film of the present invention comprises at least an aluminum layer (A) and a linear low-density polyethylene layer (B) prepared with the use of a metallocene olefin polymerization catalyst. Furthermore, the laminated film of the present invention may have a multilayer structure of at least three layers which, in addition to the aluminum layer (A) and linear low-density polyethylene layer (B), include a substrate layer (C) and a polyethylene layer (D).

Aluminum Layer (A)

An aluminum foil or an aluminum vapor deposition film is mainly employed as a material for use in the formation of the aluminum layer (A).

The thickness of the aluminum foil is generally in the range of 6 to 15 μm.

The type of substrate for use in the aluminum vapor deposition film is basically not particularly limited as long as it is a material possessing film forming capability. For example, use can be made of any polymer, paper or cellophane.

This polymer can be selected, for example, from among:

olefin polymers such as high-density polyethylene, medium-density polyethylene, low-density polyethylene, ethylene/vinyl acetate copolymer, ethylene/acrylic ester copolymer, ethylene/vinyl alcohol copolymer, ionomers, polypropylene, poly-1-butene and poly-4-methyl-1-pentene;

vinyl polymers such as polyvinyl chloride, polyvinylidene chloride, polystyrene, polyacrylates and polyacrylonitrile;

polyamides such as nylon 6, nylon 66, nylon 10, nylon 11, nylon 12, nylon 610 and poly-m-xylyleneadipamide;

polyesters such as polyethylene terephthalate (PET), polyethylene terephthalate/isophthalate and polybutylene terephthalate (PBT);

polyvinyl alcohol (PVA); and polycarbonates. The film prepared from these polymers may have no molecular orientation or may be uniaxially or biaxially oriented.

Linear Low-density Polyethylene (B)

The linear low-density polyethylene for use in the formation of the linear low-density polyethylene layer (B) is a copolymer of ethylene and an α-olefin obtained by polymerizing ethylene and an α-olefin having 3 to 20 carbon atoms in the presence of a metallocene olefin polymerization catalyst.

The α-olefin having 3 to 20 carbon atoms for use in the copolymerization with ethylene is selected from among, for example, propylene, 1-butene, 1-pentene, 1-hexene, 4-methyl-1-pentene, 1-octene, 1-decene and 1-dodecene. Of these, α-olefins having 3 to 10 carbon atoms are preferred and α-olefins having 4 to 8 carbon atoms are still preferred.

The above α-olefins can be used either individually or in combination.

In the linear low-density polyethylene for use in the present invention, the structural units derived from ethylene are preferably contained in an amount of at least 50% by weight but less than 100% by weight, still preferably from 75 to 99% by weight, yet still preferably from 75 to 95% by weight, and optimally from 83 to 95% by weight. The structural units derived from the α-olefin having 3 to 20 carbon atoms are preferably contained in an amount of not greater than 50% by weight, still preferably from 1 to 25% by weight, yet still preferably from 5 to 25% by weight, and optimally from 5 to 17% by weight.

The composition of the linear low-density polyethylene is generally determined by homogeneously dissolving about 200 mg of linear low-density polyethylene in 1 ml of hexachlorobutadiene in a sample tube of 10 mm diameter and thereafter producing and analyzing a $^{13}$C NMR spectrum of the thus obtained sample under conditions such that the measuring temperature, measuring frequency, spectral width, pulse repetition period and pulse width are 120° C., 25.05 MHz, 1500 Hz, 4.2 sec and 6 μsec, respectively.

The linear low-density polyethylene for use in the present invention has a density (measured in accordance with ASTM D 1505) of 0.895 to 0.930 g/cm³, preferably 0.895 to 0.910 g/cm³. The employment of the linear low-density polyethylene whose density is in the above range enables preparation of the desired laminated film through extrusion lamination which has an excellent balance of adherence to the aluminum layer (A) and heat sealing properties of linear low-density polyethylene layers (B).

The density is determined by heating at 100° C. for 1 hr an extrusion strand obtained at the time of measuring the melt flow rate (MFR) at 190° C. under a load of 2.16 kg, cooling it to room temperature over a period of 1 hr and measuring the density of the cooled strand by means of a density gradient tube.

The melt flow rate (MFR, measured at 190° C. under a load of 2.16 kg in accordance with ASTM D 1238) of this linear low-density polyethylene is generally in the range of 0.1 to 100 g/10 min, preferably 1 to 50 g/10 min, and still preferably 5 to 20 g/10 min.

The above linear low-density polyethylene can be produced by copolymerizing ethylene and the α-olefin having 3 to 20 carbon atoms in the presence of metallocene olefin polymerization catalyst, namely, the catalyst containing a metallocene catalyst component described in, for example, Japanese Patent Laid-open Publication Nos. 6(1994)-9724, 6(1994)-136195, 6(1994)-136196 and 6(1994)-207057.

This metallocene catalyst generally consists of a metallocene catalyst component (a1) composed of a compound of a transition metal of Group IVB of the periodic table which contains at least one ligand having a cyclopentadienyl skeleton and an organoaluminumoxy compound catalyst component (b), optionally together with a particulate support (c), an organoaluminum compound catalyst component (d) and an ionizing ionic compound catalyst component (e).

The metallocene catalyst component (a1) preferably employed in the present invention is one composed of a compound of a transition metal of Group IVB of the periodic table which contains at least one ligand having a cyclopentadienyl skeleton. This transition metal compound is, for example, one represented by the general formula:

$$ML^1_x \qquad [I]$$

wherein x represents the valence of transition metal atom M.

M represents a transition metal atom selected from among those of Group IVB of the periodic table. For example, it is zirconium, titanium or hafnium. of these, zirconium is preferred.

$L^1$ is a ligand joined to the transition metal atom M. At least one of the ligands represented by $L^1$ is one having a cyclopentadienyl skeleton.

The above ligand $L^1$ having a cyclopentadienyl skeleton, joined to the transition metal atom M, is, for example, a cyclopentadienyl group unsubstituted or substituted with an alkyl group such as a methyl group and an ethyl group, an indenyl group, a 4,5,6,7-tetrahydroindenyl group or a fluorenyl group. These groups may be substituted with a halogen atom, a trialkylsilyl group, etc.

When the above transition metal compound represented by the general formula [I] contains at least two cyclopentadienyl skeleton having groups, two cyclopentadienyl skeleton having groups thereof may be bonded with each other through the medium of an alkylene group such as ethylene or propylene, a silylene group, or a substituted silylene group such as a dimethylsilylene group or a methylphenylsilylene group.

Aluminooxanes are preferably used as the organoaluminumoxy compound catalyst component (b). For example, use is made of methylaluminooxane, ethylaluminooxane, methylethylaluminooxane and the like which individually have generally about 3 to 50 repeating units represented by the formula: —Al(R)O— wherein R represents an alkyl group. These aluminooxanes can be produced by the conventional process.

The particulate support (c) optionally used in the preparation of the olefin polymerization catalyst consists of an inorganic or organic compound and generally has a particle size of about 10 to 300 $\mu$m. Preferably, it is a 20 to 200 $\mu$m granular or particulate solid.

The inorganic support preferably consists of a porous oxide, which is, for example, $SiO_2$, $Al_2O_3$, MgO, $ZrO_2$ or $TiO_2$.

The organoaluminum compound catalyst component (d) optionally used in the preparation of the olefin polymerization catalyst can be selected from among, for example, trialkylaluminums such as trimethylaluminum, dialkylaluminum halides such as dimethylaluminum chloride and alkylaluminum sesquihalides such as methylaluminum sesquichloride.

The ionizing ionic compound catalyst component (e) can be selected from among, for example, Lewis acids such as triphenylboron, $MgCl_2$, $Al_2O_3$ and $SiO_2$—$Al_2O_3$ listed in U.S. Pat. No. 5,321,106; ionic compounds such as triphenylcarbeniumtetrakis(pentafluorophenyl) borate; and carborane compounds such as dodecaborane and bis-n-butylamonium (1-carbedodeca)borate.

The linear low-density polyethylene for use in the present invention can be obtained by copolymerizing ethylene and an α-olefin having 3 to 20 carbon atoms in the presence of the above olefin polymerization catalyst in a gaseous phase or a liquid phase such as a slurry or solution phase under various conditions.

In the present invention, when a linear low-density polyethylene having a desirable balance of melt tension and fluidity and having an excellent moldability is needed as one for use in the formation of the linear low-density polyethylene layer (B), preferred use is made of a copolymer of ethylene and an α-olefin (linear low-density polyethylene) which is:

a copolymer of ethylene and an α-olefin having 4 to 20 carbon atoms having:
(i) a density (d) ranging from 0.895 to 0.930 g/cm$^3$;
(ii) a melt flow rate (MFR), measured at 190° C. under a load of 2.16 kg, ranging from 0.1 to 100 g/10 min;
(iii) a melt flow rate (MFR, g/10 min) and a melt tension (MT, g) measured at 190° C., which satisfy the relationship:

$MT>2.0\times MFR^{-0.84}$;

(iv) a fluidity index (FI, 1/sec) defined as a shearing rate exhibited when the shearing stress of molten polymer at 190° C. has reached 2.4×10$^6$ dyne/cm$^2$, the fluidity index and the melt flow rate (MFR, g/10 min) satisfying the relationship:

$FI>75\times MFR$;

(v) a n-decane soluble content (W, wt. %) measured at 23° C., the n-decane soluble content and the density (d, g/cm$^3$) satisfying the relationship:

when $MFR \leq 10$ g/10 min, $W<80\times\exp(-100(d-0.88))+0.1$, and when $MFR>10$ g/10 min, $W<80\times(MFR-9)^{0.26}\times\exp(-100(d-0.88))+0.1$;

and
(vi) a temperature exhibited at the maximum peak of endothermic curve obtained by a differential scanning calorimeter (Tm, ° C.), the temperature and the density (d, g/cm$^3$) satisfying the relationship:

$Tm<400d-250$.

In this ethylene/α-olefin copolymer, the structural units derived from ethylene are contained in an amount of from 65 to 99% by weight, preferably from 70 to 98% by weight, and still preferably from 75 to 96% by weight. The structural units derived from the α-olefin having 4 to 20 carbon atoms are contained in an amount of from 1 to 35% by weight, preferably from 2 to 30% by weight, and still preferably from 4 to 25% by weight.

The α-olefin having 4 to 20 carbon atoms for use therein is selected from among, for example, 1-butene, 1-pentene, 1-hexene, 4-methyl-1-pentene, 1-octene, 1-decene, 1-dodecene, 1-tetradecene, 1-hexadecene, 1-octadecene and 1-eicosene.

This ethylene/α-olefin copolymer has a density (measured in accordance with ASTM D 1505) of 0.895 to 0.930 g/cm$^3$, preferably 0.895 to 0.910 g/cm$^3$.

The melt flow rate (measured at 190° C. under a load of 2.16 kg in accordance with ASTM D 1238) of this ethylene/α-olefin copolymer is in the range of 0.1 to 100 g/10 min, preferably 1 to 50 g/10 min, and still preferably 5 to 20 g/10 min.

This ethylene/α-olefin copolymer has a melt flow rate (MFR, g/10 min) and a melt tension (MT, g) measured at 190° C., which satisfy the relationship:

$MT>2.0\times MFR^{-0.84}$, preferably $MT>2.2\times MFR^{-0.84}$, and still preferably $MT>2.5\times MFR^{-0.84}$.

The ethylene/α-olefin copolymer exhibits a high melt tension and a good moldability from the viewpoint of the molecular weight thereof.

Moreover, the ethylene/α-olefin copolymer for use in the present invention has a fluidity index (FI, 1/sec) defined as a shearing rate exhibited when the shearing stress of molten polymer at 190° C. has reached 2.4×10$^6$ dyne/cm$^2$, the fluidity index and the melt flow rate (MFR, g/10 min) satisfying the relationship:

$FI > 75 \times MFR$, preferably $FI > 80 \times MFR$, and still preferably $FI > 85 \times MFR$.

Generally, ethylene/α-olefin copolymers with a narrow composition distribution also have a narrow molecular weight distribution, so that the fluidity thereof is decreased to thereby exhibit a low FI. With respect to the ethylene/α-olefin copolymer for use in the present invention, the FI and MFR satisfy the above relationship, so that a low stress is maintained up to a high shearing rate, thereby ensuring an excellent moldability.

The ethylene/α-olefin copolymer for use in the present invention has a n-decane soluble content (W, wt. %) measured at 23° C., the n-decane soluble content and the density (d, g/cm³) satisfying the relationship:

when $MFR \leq 10$ g/10 min, $W < 80 \times \exp(-100(d - 0.88)) + 0.1$, preferably $W < 60 \times \exp(-100(d - 0.88)) + 0.1$, and still preferably $W < 40 \times \exp(-100(d - 0.88)) + 0.1$;

and when $MFR > 10$ g/10 min, $W < 80 \times (MFR - 9)^{0.26} \times \exp(-100(d - 0.88)) + 0.1$.

The above ethylene/α-olefin copolymer having a small n-decane soluble content can be stated a narrow composition distribution.

The ethylene/α-olefin copolymer for use in the present invention has a temperature (Tm, ° C.) exhibited at the maximum peak of endothermic curve obtained by a differential scanning calorimeter (DSC), the temperature and the density (d, g/cm³) satisfying the relationship:

$Tm < 400 \times d - 250$, preferably $Tm < 450 \times d - 297$, still preferably $Tm < 500 \times d - 344$, and optimally $Tm < 550 \times d - 391$.

The temperature Tm of the above ethylene/α-olefin copolymer is low from the viewpoint of the density thereof, so that the ethylene/α-olefin copolymer exhibits excellent heat sealing properties as compared with those of ethylene/α-olefin copolymers not satisfying the above relationship even if the same density.

This ethylene/α-olefin copolymer can be produced, for example, by copolymerizing ethylene and the α-olefin having 4 to 20 carbon atoms in the presence of an olefin polymerization catalyst so that the obtained polymer has a density of 0.895 to 0.930 g/cm³. The olefin polymerization catalyst is prepared from:

(a2) a compound of a transition metal of Group IVB of the periodic table which contains a bidentate ligand comprising two groups selected from among specified indenyl group and groups derived therefrom by substitution, the two groups bonded with each other through the medium of a lower alkylene group, or a compound of a transition metal of Group IVB of the periodic table which contains specified substituted cyclopentadienyl group as a ligand, (b) an organoaluminumoxy compound, and (c) a particulate support, optionally together with (d) an organoaluminum compound.

The above olefin polymerization catalyst and individual catalyst components thereof will be described below.

The above compound (a2), namely compound of a transition metal of Group IVB of the periodic table (hereinafter may be referred to as "component (a2)") is, for example, a transition metal compound represented by the formula:

$$ML^2_x \qquad [II]$$

wherein M represents a transition metal atom selected from among those of Group IVB of the periodic table, and $L^2$ represents a ligand joined to the transition metal atom. At least two of the ligands represented by $L^2$ are substituted cyclopentadienyl groups each having 2 to 5 substituents selected only from among methyl and ethyl groups, and the ligand $L^2$ other than the substituted cyclopentadienyl groups is a hydrocarbon group having 1 to 12 carbon atoms, an alkoxy group, an aryloxy group, a halogen atom, a trialkylsilyl group or a hydrogen atom. x is the valence of transition metal atom M.

In the above formula [II], M represents a transition metal atom selected from among those of Group IVB of the periodic table. For example, it is zirconium, titanium or hafnium. Of these, zirconium is preferred.

$L^2$ represents a ligand joined to the transition metal atom M. At least two of the ligands represented by $L^2$ are substituted cyclopentadienyl groups each having 2 to 5 substituents selected only from among methyl and ethyl groups. The individual ligands may be identical with each other or different from each other. Among the substituted cyclopentadienyl groups, cyclopentadienyl groups having 2 or 3 substituents are preferred, disubstituted cyclopentadienyl groups are still preferred, and 1,3-disubstituted cyclopentadienyl groups are especially preferred. The substituents may be identical with each other or different from each other.

In the above formula [II], the ligand $L^2$ joined to the transition metal atom M other than the substituted cyclopentadienyl groups is a hydrocarbon group having 1 to 12 carbon atoms, an alkoxy group, an aryloxy group, a halogen atom, a trialkylsilyl group or a hydrogen atom.

The hydrocarbon group having 1 to 12 carbon atoms is, for example, an alkyl group, a cycloalkyl group, an aryl group or an aralkyl group. More specifically, it is, for example, an alkyl group such as methyl, ethyl, n-propyl, isopropyl, n-butyl, isobutyl, sec-butyl, t-butyl, pentyl, hexyl, octyl, 2-ethylhexyl or decyl; a cycloalkyl group such as cyclopentyl or cyclohexyl; an aryl group such as phenyl or tolyl; or an aralkyl group such as benzyl or neophyl.

The alkoxy group is, for example, methoxy, ethoxy, n-propoxy, isopropoxy, n-butoxy, isobutoxy, sec-butoxy, t-butoxy, pentoxy, hexoxy or octoxy.

The aryloxy group is, for example, phenoxy.

The halogen atom is fluorine, chlorine, bromine or iodine.

The trialkylsilyl group is, for example, trimethylsilyl, triethylsilyl or triphenylsilyl.

Examples of these transition metal compounds represented by the formula [II] include:

bis(dimethylcyclopentadienyl)zirconium dichloride,
bis(diethylcyclopentadienyl)zirconium dichloride,
bis(methylethylcyclopentadienyl)zirconium dichloride, bis(dimethylethylcyclopentadienyl)zirconium dichloride,
bis(dimethylcyclopentadienyl)zirconium dibromide,
bis(dimethylcyclopentadienyl)zirconium methoxychloride,
bis(dimethylcyclopentadienyl)zirconium ethoxychloride,
bis(dimethylcyclopentadienyl)zirconium butoxychloride,
bis(dimethylcyclopentadienyl)zirconium diethoxide,
bis(dimethylcyclopentadienyl)zirconium methylchloride,
bis(dimethylcyclopentadienyl)zirconyldimethyl,
bis(dimethylcyclopentadienyl)zirconium benzylchloride,
bis(dimethylcyclopentadienyl)zirconyldibenzyl,
bis(dimethylcyclopentadienyl)zirconium phenylchloride,
and bis(dimethylcyclopentadienyl)zirconium hydride chloride.

In the above examples, the disubstituted cyclopentadienyl ring includes 1,2- and 1,3-disubstituted cyclopentadienyl ring, and the trisubstituted cyclopentadienyl ring includes 1,2,3- and 1,2,4-trisubstituted cyclopentadienyl ring. In the present invention, use can be made of transition metal compounds as obtained by substituting the zirconium metal of the above zirconium compounds with titanium or hafnium metal.

Among these transition metal compounds represented by the formula [II], bis(1,3-dimethylcyclopentadienyl) zirconium dichloride, bis(1,3-diethylcyclopentadienyl) zirconium dichloride and bis(1-methyl-3-ethylcyclopentadienyl)zirconium dichloride are especially preferred.

The organoaluminumoxy compound (b) (hereinafter may be referred to as "component (b)") may be any of common benzene-soluble aluminooxanes, or benzene-insoluble organoaluminumoxy compounds as disclosed in Japanese Patent Laid-open Publication No. 2(1990)-276807.

The common aluminooxanes can be produced, for example, by contacting the below described organoaluminum compound with water such as adsorbed water, crystal water, ice or steam, or by reacting the below described organoaluminum compound and organotin oxide.

The particulate support (c) (hereinafter may be referred to as "component (c)") may be a granular or particulate solid consisting of an inorganic or organic compound and having a particle size of 10 to 300 μm, preferably 20 to 200 μm.

The inorganic compound support preferably consists of a porous oxide, which is, for example, selected from among $SiO_2$, $Al_2O_3$, MgO, $ZrO_2$, $TiO_2$, $B_2O_3$, CaO, ZnO, BaO, $ThO_2$ and mixtures thereof, for example, $SiO_2/MgO$, $SiO_2/Al_2O_3$, $SiO_2/TiO_2$, $SiO_2/V_2O_5$, $SiO_2/Cr_2O_3$ and $SiO_2/TiO_2/MgO$. Of these, oxides composed mainly of at least one member selected from the group consisting of $SiO_2$ and $Al_2O_3$ are preferred.

The above inorganic oxide can contain without any detriment a small amount of carbonate, sulfate, nitrate or oxide component such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$.

Although the properties of particulate supports of the inorganic compound are different depending on the type and production process, the particulate support suitably employed in the present invention preferably has a specific surface area of 50 to 1000 m²/g, still preferably 100 to 700 m²/g, and a pore volume of 0.3 to 2.5 cm³/g. The particulate support, according to necessity. is sintered at 100 to 1000° C., preferably 150 to 700° C., before use.

Further, the organic compound support is, for example, a (co)polymer composed mainly of units of an α-olefin having 2 to 14 carbon atoms, such as ethylene, propylene, 1-butene or 4-methyl-1-pentene, or a polymer or copolymer composed mainly of vinylcyclohexane or styrene.

The olefin polymerization catalyst for use in the production of the ethylene/α-olefin copolymer can be prepared from the above components (a2), (b) and (c). According to necessity, an organoaluminum compound (d) may be used in the preparation.

The organoaluminum compound (d) (hereinafter may be referred to as "component (d)") employed according to necessity can be one represented by, for example, the general formula:

$$R^1{}_n AlX_{3-n} \qquad [III]$$

wherein $R^1$ represents a hydrocarbon group having 1 to 12 carbon atoms, X represents a halogen atom or a hydrogen atom, and n is 1 to 3.

In the general formula [III], $R^1$ represents a hydrocarbon group having 1 to 12 carbon atoms, for example, an alkyl group, a cycloalkyl group or an aryl group. More specifically, it is, for example, methyl, ethyl, n-propyl, isopropyl, isobutyl, pentyl, hexyl, octyl, cyclopentyl, cyclohexyl, phenyl or tolyl.

Specific examples of suitable organoaluminum compounds include:

trialkylaluminums such as trimethylaluminum, triethylaluminum, triisopropylaluminum, triisobutylaluminum, trioctylaluminum and tri-2-ethylhexylaluminum;

alkenylaluminums such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide.; and alkylaluminum hydrides such as diethylaluminum hydride and diisobutylaluminum hydride.

Also, as the organoaluminum compound (d), use can be made of compounds represented by the general formula:

$$R^1{}_n AlY_{3-n} \qquad [IV]$$

wherein
$R^1$ represents the same hydrocarbon group as used in the general formula [III];

Y represents a group of the formula: $-OR^2$, $-OSiR^3{}_3$, $-OAlR^4{}_2$, $-NR^5{}_2$, $-SiR^6{}_3$ or $-N(R^7)AlR^8{}_2$;

n is 1 to 2;

each of $R^2$, $R^3$, $R^4$ and $R^8$ represents, for example, a methyl group, an ethyl group, an isopropyl group, an isobutyl group, a cyclohexyl group or a phenyl group;

$R^5$ represents, for example, a hydrogen atom, a methyl group, an ethyl group, an isopropyl group, a phenyl group or a trimethylsilyl group; and each of $R^6$ and $R^7$ represents, for example, a methyl group or an ethyl group.

Among these organoaluminum compounds, compounds represented by the formula: $R^1{}_n Al(OAlR^4{}_2)_{3-n}$, for example, compounds represented by the formulae: $(C_2H_5)_2AlOAl(C_2H_5)_2$ and $(iso-C_4H_9)_2AlOAl(iso-C_4H_9)_2$ are preferred.

Among the organoaluminum compounds represented by the above general formulae [III] and [IV], compounds represented by the general formula: $R^1{}_3Al$ are preferred. Compounds wherein $R^1$ is an isoalkyl group are especially preferred.

In the production of the ethylene/α-olefin copolymer, use is made of the catalyst prepared by bringing the above components (a2), (b) and (c) optionally together with the component (d) into contact.

This component contact can be performed in an inert hydrocarbon solvent. The inert hydrocarbon solvent for use in the preparation of the catalyst can be selected from among, for example, aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride, chlorobenzene and dichloromethane; and mixtures thereof.

The catalyst for use in the production of the ethylene/α-olefin copolymer may be a prepolymerized catalyst which is obtained by prepolymerizing an olefin in the presence of the above components (a2), (b) and (c) optionally together with the component (d). This prepolymerization can be performed by introducing an olefin into an inert hydrocarbon solvent in the presence of the above components (a2), (b) and (c) optionally together with the component (d).

Ethylene or the α-olefin having 4 to 20 carbon atoms mentioned above can be mentioned as the olefin for use in the prepolymerization. Especially, ethylene or a combination of ethylene and the α-olefin employed in the polymerization is preferred.

The prepolymerization can be performed by both a batch process and a continuous process. Further, the prepolymerization can be performed under any of reduced, ordinary and superatmospheric pressures. In the prepolymerization, it is preferred that a prepolymer whose intrinsic viscosity [η], measured in decalin at 135° C., is at least in the range of 0.2 to 7 dl/g, especially 0.5 to 5 dl/g, be produced by causing hydrogen to be present in the prepolymerization reaction.

The ethylene/α-olefin copolymer is obtained by copolymerizing ethylene and the above α-olefin having 4 to 20 carbon atoms in the presence of the above olefin polymerization catalyst or prepolymerized catalyst.

In the present invention, the copolymerization of ethylene and an α-olefin can be performed in a gaseous phase or a slurry liquid phase.

When a slurry polymerization is performed, an inert hydrocarbon may be used as the solvent, or the olefin per se can be used as the solvent.

The inert hydrocarbon solvent for use in the slurry polymerization can be selected from among, for example, aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and light oil. Of these inert hydrocarbon solvents, aliphatic hydrocarbons, alicyclic hydrocarbons and petroleum fractions are preferred.

In the practice of the slurry polymerization or gaseous phase polymerization process, the above olefin polymerization catalyst. or prepolymerized catalyst is preferably used in an amount of $10^{-8}$ to $10^{-3}$ gram atom/liter, still preferably $10^{-7}$ to $10^{-4}$ gram atom/liter, in terms of the concentration of transition metal atom in the polymerization reaction system.

In this polymerization, the organoaluminumoxy compound and/or organoaluminum compound (d) like the component (b) may be added to the reaction system. In the polymerization, the atomic ratio (Al/M) of aluminum atoms (Al) ascribed to the organoaluminumoxy compound and organoaluminum compound to transition metal atoms (M) ascribed to the transition metal compound (a2) is in the range of 5 to 300, preferably 10 to 200, and still preferably 15 to 150.

The polymerization temperature is generally in the range of −50 to 100° C., preferably 0 to 90° C., in the practice of the slurry polymerization process, and is generally in the range of 0 to 120° C., preferably, 20 to 100° C., in the practice of the gaseous phase polymerization process.

The polymerization is generally performed under superatmospheric conditions which range from atmospheric pressure to 100 kg/cm², preferably 2 to 50 kg/cm². The polymerization can be performed by any of the batch process, semicontinuous process and continuous process.

Further, the polymerization can be performed in at least two stages employing reaction conditions different from each other.

In the present invention, according to necessity, the above linear low-density polyethylene can be loaded with conventional additives such as a slip agent, an antiblocking agent, an antistatic agent, a weathering stabilizer, a heat resisting stabilizer, an antifogging agent, a pigment, a dye or a filler in an amount not detrimental to the object of the present invention.

In the laminated film of the present invention, the thickness of the linear low-density polyethylene layer (B) is generally in the range of 10 to 50 μm, preferably 15 to 30 μm.

Although the linear low-density polyethylene layer (B) is generally used as a sealant layer, it can also be used as an intermediate layer of the laminated film.

Substrate Layer (C)

The laminated film of the present invention may include a substrate layer (C). The type of substrate for use in this substrate layer (C) is not particularly limited as long as it is a material possessing film forming capability. For example, use can be made of any polymer, paper or cellophane. An anchor coating agent such as urethane type ones may be applied to the surface of the substrate layer (C).

This polymer can be selected, for example, from among:

olefin polymers such as high-density polyethylene, medium-density polyethylene, low-density polyethylene, ethylene/vinyl acetate copolymer, ethylene/acrylic ester copolymer, ethylene/vinyl alcohol copolymer, ionomers, polypropylene, poly-1-butene and poly-4-methyl-1-pentene;

vinyl polymers such as polyvinyl chloride, polyvinylidene chloride, polystyrene, polyacrylates and polyacrylonitrile;

polyamides such as nylon 6, nylon 66, nylon 10, nylon 11, nylon 12, nylon 610 and poly-m-xylyleneadipamide;

polyesters such as polyethylene terephthalate (PET), polyethylene terephthalate/isophthalate and polybutylene terephthalate (PBT);

polyvinyl alcohol (PVA); and polycarbonates. The film prepared from these polymers may have no molecular orientation or may be uniaxially or biaxially oriented. The surface of this film may be coated with polyvinylidene chloride or may be provided with a metal material such as aluminum or silicon by vapor deposition.

When paper is used as the substrate, the substrate at its side opposite to that brought into contact with the polyethylene layer (D) may be coated with the above polymer or may be laminated with a film of the above polymer.

In the laminated film of the present invention, the thickness of the substrate layer (C) is generally in the range of 10 to 30 μm, preferably 12 to 15 μm.

Polyethylene Layer (D)

In the laminated film of the present invention, the polyethylene layer (D) may be laminated onto the surface of the aluminum layer (A), linear low-density polyethylene layer (B) or substrate layer (C). Mainly, the high-pressure-processed low-density polyethylene is used in the formation of the polyethylene layer (D). This high-pressure-processed low-density polyethylene is one produced by polymerizing ethylene in the presence of a radical polymerization catalyst under a high pressure. According to necessity, ethylene may be copolymerized with a small amount of another vinyl monomer.

The high-pressure-processed low-density polyethylene for use in the present invention generally has a density (measured in accordance with ASTM D 1505) of 0.915 to 0.935 g/cm$^3$, preferably 0.915 to 0.925 g/cm$^3$. The high-pressure-processed low-density polyethylene whose density is in the above range is excellent in extrusion lamination workability. The density is determined by heating at 100° C. for 1 hr an extrusion strand obtained at the time of measuring the melt flow rate (MFR) at 190° C. under a load of 2.16 kg, cooling it to room temperature over a period of 1 hr and measuring the density of the cooled strand by means of a density gradient tube.

The melt flow rate (MFR, measured at 190° C. under a load of 2.16 kg in accordance with ASTM D 1238) of this high-pressure-processed low-density polyethylene is in the range of 1 to 70 g/10 min, preferably 3 to 25 g/10 min. The high-pressure-processed low-density polyethylene whose melt flow rate is in the above range is excellent in extrusion lamination workability.

Besides the above high-pressure-processed low-density polyethylene, the linear low-density polyethylene produced by the use of conventional olefin polymerization catalysts such as Ziegler and metallocene olefin polymerization catalysts can be used in the formation of the polyethylene layer (D). The linear low-density polyethylene is a copolymer of ethylene and at least one α-olefin. This α-olefin has at least 4 carbon atoms, preferably 5 to 8 carbon atoms, and is selected from among, for example, 1-butene, 1-pentene, 1-hexene, 1-heptene, 1-octene and 4-methyl-1-pentene.

With respect to the ethylene to α-olefin comonomer ratio of the linear low-density polyethylene, the ratio of structural units derived from ethylene is preferably in the range of from 85 to 99.5 mol %, still preferably from 90 to 99.0 mol %. The ratio of structural units derived from the α-olefin having at least 4 carbon atoms is preferably in the range of from 0.5 to 15 mol %, still preferably from 1.0 to 10 mol %.

The density (measured in accordance with ASTM D 1505) of the linear low-density polyethylene is generally in the range of 0.890 to 0.930 g/cm$^3$, preferably 0.910 to 0.925 g/cm$^3$. The linear low-density polyethylene whose density is in the above range is excellent in extrusion lamination workability and interlayer adherence to an anchor coating layer.

The melt flow rate (MFR, measured at 190° C. under a load of 2.16 kg in accordance with ASTM D 1238) of this linear low-density polyethylene is generally in the range of 1 to 50 g/10 min, preferably 5 to 40 g/10 min, and still preferably 7 to 20 g/10 min. The linear low-density polyethylene whose melt flow rate is in the above range has excellent fluidity (extrudability).

A resin composition consisting of a blend of the above high-pressure-processed low-density polyethylene (HP-LDPE) and linear low-density polyethylene (L-LDPE) can be used in the polyethylene layer (D). The blend weight ratio of HP-LDPE/L-LDPE is generally in the range of 70/30 to 40/60, preferably 65/35 to 50/50.

Moreover, a medium-density polyethylene and a high-density polyethylene can be used in the polyethylene layer (D).

In the production of the laminated film of multilayer structure having at least three layers including the polyethylene layer (D) laminated to one side of the linear low-density polyethylene layer (B) prepared with the use of the above metallocene olefin polymerization catalyst, when linear low-density polyethylene prepared with the use of the metallocene olefin polymerization catalyst is employed as the polyethylene constituting the polyethylene layer (D), it is preferred that use be made of linear low-density polyethylene whose properties are different from those of the linear low-density polyethylene constituting the linear low-density polyethylene layer (B) or linear low-density polyethylene composition wherein, for example, the type and amount of additives, etc. are varied.

According to necessity, this resin composition can be loaded with conventional additives such as a slip agent, an antiblocking agent, an antistatic agent, a weathering stabilizer, a heat resisting stabilizer, an antifogging agent, a pigment, a dye or a filler in an amount not detrimental to the object of the present invention.

This resin composition is obtained by conducting blending or melt kneading of the above high-pressure-processed low-density polyethylene and linear low-density polyethylene optionally together with the above additives in accordance with the customary technique.

The melt flow rate (MFR, measured at 190° C. under a load of 2.16 kg in accordance with ASTM D 1238) of the thus prepared resin composition is generally in the range of 1 to 50 g/10 min, preferably 3 to 20 g/10 min. The density (measured in accordance with ASTM D 1505) of the resin composition is generally in the range of 0.900 to 0.930 g/cm$^3$, preferably 0.910 to 0.925 g/cm$^3$. This resin composition is excellent in extrusion lamination workability (high-speed spreadability and neck-in).

In the laminated film of the present invention, the thickness of the polyethylene layer (D) is generally in the range of 5 to 50 μm, preferably 10 to 30 μm.

Laminated Film

The laminated film of the present invention comprises at least the aluminum layer (A) and the linear low-density polyethylene layer (B), and optionally together with the substrate layer (C) and further the polyethylene layer (D), integrated together by extrusion lamination.

With respect to the laminated film of multilayer structure having at least three layers as obtained by adding layers to the laminated film comprising the aluminum layer (A) and the linear low-density polyethylene layer (B) integrated together by extrusion lamination, in the present invention, the structures thereof are arbitrary, which, for example, include:

(1) substrate layer (C)/aluminum layer (A)/linear low-density polyethylene layer (B), and (2) substrate layer (C)/polyethylene layer (D)/aluminum layer (A)/linear low-density polyethylene layer (B), these representing fundamental structures with which the above various materials are combined;

(3) substrate layer (C)/polyethylene layer (D)/aluminum layer (A)/linear low-density polyethylene layer (B)/polyethylene layer (D), this structure being for the purpose of shielding the odor of the linear low-density polyethylene layer (B) laminated at high temperature and for the purpose of compensating for the lowered heat sealing properties; and (4) substrate layer (C)/polyethylene layer (D)/substrate layer (C)/aluminum layer (A)/linear low-density polyethylene layer (B), this structure being for the purpose of enhancing the nerve of the laminated film.

As a special example of the multilayer laminated film structure, there can be mentioned:

(5) substrate layer (C)/linear low-density polyethylene layer (B)/aluminum layer (A)/polyethylene layer (D).

Specific forms of the above structure (1) include:
1) biaxially oriented nylon film layer/aluminum foil layer/metallocene linear low-density polyethylene layer,
2) polyethylene terephthalate film layer/aluminum foil layer/metallocene linear low-density polyethylene layer,
3) biaxially oriented polypropylene film layer/aluminum foil layer/metallocene linear low-density polyethylene layer,
4) biaxially oriented nylon film layer/aluminum vapor deposition polypropylene film layer/metallocene linear low-density polyethylene layer, and
5) biaxially oriented polypropylene film layer/aluminum vapor deposition polypropylene film layer/metallocene linear low-density polyethylene layer.

The terminology "metallocene linear low-density polyethylene" used herein means the linear low-density polyethylene prepared with the use of the metallocene olefin polymerization catalyst.

Specific forms of the above structure (2) include:
1) biaxially oriented nylon film layer/high-pressure-processed low-density polyethylene layer/aluminum foil layer/metallocene linear low-density polyethylene layer,
2) polyethylene terephthalate film layer/high-pressure-processed low-density polyethylene layer/aluminum foil layer/metallocene linear low-density polyethylene layer,
3) biaxially oriented polypropylene film layer/high-pressure-processed low-density polyethylene layer/aluminum foil layer/metallocene linear low-density polyethylene layer,
4) paper layer/high-pressure-processed low-density polyethylene layer/aluminum foil layer/metallocene linear low-density polyethylene layer,
5) (high-pressure-processed low-density polyethylene layer/paper layer)/high-pressure-processed low-density polyethylene layer/aluminum foil layer/metallocene linear low-density polyethylene layer,
6) biaxially oriented nylon film layer/layer of a mixture of Ziegler linear low-density polyethylene and high-pressure-processed low-density polyethylene/aluminum foil layer/metallocene linear low-density polyethylene layer,
7) polyethylene terephthalate film layer/layer of a mixture of Ziegler linear low-density polyethylene and high-pressure-processed low-density polyethylene/aluminum foil layer/metallocene linear low-density polyethylene layer,
8) biaxially oriented polypropylene film layer/layer of a mixture of Ziegler linear low-density polyethylene and high-pressure-processed low-density polyethylene/aluminum foil layer/metallocene linear low-density polyethylene layer,
9) paper layer/layer of a mixture of Ziegler linear low-density polyethylene and high-pressure-processed low-density polyethylene/aluminum foil layer/metallocene linear low-density polyethylene layer,
10) (high-pressure-processed low-density polyethylene layer/paper layer)/layer of a mixture of Ziegler linear low-density polyethylene and high-pressure-processed low-density polyethylene/aluminum foil layer/metallocene linear low-density polyethylene layer,
11) biaxially oriented nylon film layer/high-pressure-processed low-density polyethylene layer/aluminum vapor deposition polypropylene film layer/metallocene linear low-density polyethylene layer,
12) biaxially oriented polypropylene film layer/high-pressure-processed low-density polyethylene layer/aluminum vapor deposition polypropylene film layer/metallocene linear low-density polyethylene layer,
13) paper layer/high-pressure-processed low-density polyethylene layer/aluminum vapor deposition polypropylene film layer/metallocene linear low-density polyethylene layer, and
14) biaxially oriented nylon film layer/high-pressure-processed low-density polyethylene layer/aluminum vapor deposition ethylene/vinyl alcohol copolymer film layer/metallocene linear low-density polyethylene layer.

The terminology "Ziegler linear low-density polyethylene" used herein means the linear low-density polyethylene prepared with the use of the Ziegler olefin polymerization catalyst.

Specific forms of the above structure (3) include:
1) biaxially oriented nylon film layer/high-pressure-processed low-density polyethylene layer/aluminum foil layer/metallocene linear low-density polyethylene layer/high-pressure-processed low-density polyethylene layer, and
2) biaxially oriented nylon film layer/high-pressure-processed low-density polyethylene layer/aluminum foil layer/metallocene linear low-density polyethylene layer/metallocene linear low-density polyethylene layer.

Specific forms of the above structure (4) include:
1) biaxially oriented nylon film layer/high-pressure-processed low-density polyethylene layer/biaxially oriented nylon film layer/aluminum foil layer/metallocene linear low-density polyethylene layer,
2) polyethylene terephthalate film layer/high-pressure-processed low-density polyethylene layer/polyethylene terephthalate film layer/aluminum foil layer/metallocene linear low-density polyethylene layer,
3) biaxially oriented polypropylene film layer/high-pressure-processed low-density polyethylene layer/biaxially oriented polypropylene film layer/aluminum foil layer/metallocene linear low-density polyethylene layer,
4) paper layer/high-pressure-processed low-density polyethylene layer/paper layer/aluminum foil layer/metallocene linear low-density polyethylene layer, and
5) (high-pressure-processed low-density polyethylene layer/paper layer)/biaxially oriented polypropylene film layer/high-pressure-processed low-density polyethylene layer/biaxially oriented nylon film layer/aluminum foil layer/metallocene linear low-density polyethylene layer.

When the laminated film of the present invention is a double layer film composed of the aluminum layer (A) and the linear low-density polyethylene layer (B) or has its surface layer composed of the linear low-density polyethylene layer (B), the concentration of oxygen (excluding oxygen ascribed to the additives, etc.) of linear low-density polyethylene per se at the surface of the linear low-density polyethylene layer (B) is in the range of 1.0 to 1.4 atomic %, preferably 1.2 to 1.3 atomic %. The oxygen atoms contained in the linear low-density polyethylene per se at the surface of the linear low-density polyethylene layer (B) are brought from outside like the atmosphere oxygen and are believed to be taken in from, for example, the atmosphere oxygen when the aluminum layer (A) is laminated with the linear low-density polyethylene layer (B) by extrusion. When this oxygen concentration is in the above range, high heat seal strength and low seal starting temperature can be realized. This oxygen concentration can be determined by producing an X-ray photoelectron spectrum of the surface of the linear low-density polyethylene layer (B), determining an atomic composition from the peak intensities and making a calculation. When not only the linear low-density polyethylene but also the additives, etc. are contained in the linear low-density polyethylene layer (B), the determination of the oxygen concentration can be effected with the additives, etc. excluded.

Process for Producing Laminated Film

The laminated film consisting of the aluminum layer (A) and the linear low-density polyethylene layer (B) according to the present invention can be produced by the employment of the customary extrusion lamination technique and by regulating the lamination conditions so that the oxygen concentration at the surface of the linear low-density polyethylene layer (B) falls within the range of 1.0 to 1.4 atomic %. For example, the laminated film can be produced by heating the linear low-density polyethylene prepared with the use of the metallocene olefin polymerization catalyst at 310 to 320° C., preferably 312 to 318° C. (resin temperature) and by regulating the lamination atmosphere and lamination speed.

Further, the laminated film consisting of a laminate of the linear low-density polyethylene layer (B), the aluminum layer (A) and substrate layer (C) arranged in this order according to the present invention can be produced by, for example, carrying out a dry lamination of the substrate layer (C) and the aluminum layer (A) and overlaying the aluminum layer (A) with the linear low-density polyethylene layer (B) by the extrusion lamination conducted under the above conditions.

Still further, the laminated film consisting of a laminate of the linear low-density polyethylene layer (B), the aluminum layer (A), the polyethylene layer (D) and the substrate layer (C) arranged in this order according to the present invention can be produced by, for example, laminating the substrate layer (C) with the polyethylene layer (D) and the aluminum layer (A) in this order in accordance with the tandem lamination technique and thereafter overlaying the aluminum layer (A) with the linear low-density polyethylene layer (B) by the extrusion lamination conducted under the above conditions.

The laminated films of the present invention with layer structures different from those of the above laminated films can also be produced by the employment of the above lamination technique or the like.

Effect of the Invention

The present invention enables providing at low cost a laminated film which comprises an aluminum layer composed of, for example, an aluminum foil or an aluminum vapor deposition film and a linear low-density polyethylene layer prepared with the use of a metallocene olefin polymerization catalyst, thereby having a desirable balance of aluminum bond strength and heat sealing properties of linear low-density polyethylene layers. Further, the present invention enables providing at low cost a laminated film comprising at least a linear low-density polyethylene layer, an aluminum layer composed of, for example, an aluminum foil or an aluminum vapor deposition film and a substrate layer arranged in this order by adding layers to the above laminated film.

The laminated film of the present invention is suitable to, for example, a packaging material for dry foods. Examples of dry foods include snacks such as potato chips, sweet stuffs such as biscuits, rice crackers and chocolate, powder flavorings such as powder soup and stock, and foods such as flakes of dried bonito and smoked meat.

EXAMPLE

The present invention will now be illustrated in greater detail with reference to the following Examples, which in no way limit the scope of the invention.

With respect to the laminated films obtained in the Examples and Comparative Examples, the tests for the heat sealing properties, aluminum bond strength and surface oxygen concentration were carried out in the following manners:

<Testing Method>
(1) Heat Sealing Properties

A heat seal strength test was conducted under the below indicated conditions. A heat seal starting temperature was measured in the heat seal strength testing, and the low temperature heat sealing properties were evaluated by the heat seal starting temperature. The terminology "heat seal starting temperature" used herein means the temperature exhibited upon the change of interfacial peeling to cohesive peeling on the peel surface in the heat seal strength testing.
[Heat Sealing Conditions]
  one-side heating bar sealer employed,
  heat seal pressure: 2 kg/cm$^2_1$
  heat seal time: 0.5 sec,
  width of seal bar: 10 mm,
  width of test piece: 15 mm,
  peel angle: 180 degrees, and
  peel speed: 300 mm/min.
(2) Aluminum Bond Strength Extrusion laminated film of the structure: paper layer/high-pressure-processed low-density polyethylene layer (20 μm thickness)/aluminum foil layer (9 μm thickness)/sealant resin layer (30 μm thickness)/urethane anchor coating agent/polyethylene terephthalate layer (12 μm thickness) was prepared, and the bond strength between the aluminum layer and the sealant resin layer was measured under the following conditions.
[Conditions for Measuring Interlayer Bond Strength]
  peel angle: 180 degrees,
  peel speed: 300 mm/min, and
  width of test piece: 15 mm.
(3) Surface Oxygen Concentration An X-ray photoelectron spectrum of the surface of the metallocene linear low-density polyethylene layer of each extrusion laminated film was produced, an atomic composition was determined from the peak intensities, and the surface oxygen concentration was calculated.

With respect to the linear low-density polyethylene (ethylene/α-olefin copolymer) for use in the present invention, the property value definitions and measuring methods are as follows:
(1) Density A strand obtained at the time of measuring the melt flow rate at 190° C. under a load of 2.16 kg was heated at 100° C. for 1 hr and slowly cooled to room temperature over a period of 1 hr, and the density of the cooled strand was measured by means of a density gradient tube.
(2) Composition of Copolymer The composition of each copolymer was determined by $^{13}$C-NMR. Specifically, about 200 mg of copolymer powder was homogeneously dissolved in 1 ml of hexachlorobutadiene in a sample tube of 10 mm diameter. The composition was determined by producing a $^{13}$C-NMR spectrum of the thus prepared sample under such conditions that the measuring temperature, measuring frequency, spectrum width, pulse repetition period and pulse width were 120° C., 25.05 MHz, 1500 Hz, 4.2 sec and 6 μsec, respectively.
(3) Melt Flow Rate (MFR)

The melt flow rate was measured at 190° C. under a load of 2.16 kg in accordance with ASTM D 1238-65T.
(4) Maximum Peak Temperature Measured by Differential Scanning Calorimeter (DSC) (Tm)

The measuring was conducted by the use of model DSC-7 apparatus manufactured by Perkin-Elmer Corp. The temperature (Tm) at the maximum peak position of endothermic curve was determined from the endothermic curve obtained by packing an aluminum pan with about 5 mg of each sample, heating it to 200° C. at a rate of 10° C./min, maintaining 200° C. for 5 min, conducting a cooling to room temperature at a rate of 10° C./min and conducting a heating at a rate of 10° C./min.

(5) n-Decane Soluble Content (W)

The n-decane soluble content of copolymer was determined by adding about 3 g of each copolymer to 450 ml of n-decane, effecting a dissolution at 145° C., cooling to 23° C., filtering to thereby remove n-decane insoluble matter and recovering n-decane soluble matter from the filtrate.

The n-decane soluble content is defined as follows:

$W$=(wt. of n-decane soluble matter)/(wt. of n-decane insoluble plus soluble matter)×100 (%).

The smaller the n-decane soluble content, the narrower the composition distribution.

(6) Melt Tension (MT)

The melt tension was determined by stretching each molten polymer at a fixed speed and measuring the stress at the stretching. Specifically, each copolymer was pelletized to obtain a sample, and the measuring was conducted by the use of MT tester manufactured by Toyo Seiki Co., Ltd. under such conditions that the resin temperature, extrusion speed, take-up speed, nozzle diameter and nozzle length were 190° C., 15 mm/min, 10 to 20 m/min, 2.09 mm and 8 mm, respectively.

(7) Fluidity Index (FI)

The fluidity index was determined by extruding each resin through a capillary while changing the shearing rate and measuring the stress at the extrusion. Specifically, use was made of the same sample as in the MT measurement, and the measuring was performed by means of capillary flow property tester manufactured by Toyo Seiki Co., Ltd. under such conditions that the resin temperature and shearing stress range were 190° C. and from about 5×10$^4$ to 3×10$^6$ dyne/cm$^2$, respectively.

The measuring was conducted with the diameter of the nozzle (capillary) changed depending on the MFR (g/10 min) of measured resin, as follows:

0.5 mm when MFR>20,
1.0 mm when 20≧MFR>3,
2.0mm when 3≧MFR>0.8, and
3.0 mm when 0.8≧MFR.

Example 1

A urethane anchor coating agent was applied onto one side of 15 μm thick biaxially oriented nylon film (trade name: Emblem ONM, produced by Unitika, Ltd.; hereinafter referred to as "film ONy"), and the solvent thereof was evaporated off. The treated side of the film ONy was overlaid at a thickness of 25 μm with a resin blend consisting of 50 parts by weight of linear low-density polyethylene prepared with the use of Ziegler olefin polymerization catalyst (hereinafter referred to as "polyethylene T-LLDPE") and a 50 parts by weight of high-pressure-processed low-density polyethylene (hereinafter referred to as "polyethylene HPLDPE") by extrusion lamination. The resin blend layer was further overlaid at a thickness of 30 μm with linear low-density polyethylene prepared with the use of metallocene olefin polymerization catalyst (hereinafter referred to as "polyethylene M-LLDPE") whose density, MFR and α-olefin were 0.900 g/cm$^3$, 7.3 g/10 min and 1-octene, respectively, by extrusion lamination. Thus, there was obtained an extrusion laminated film consisting of: 15 μm thick layer of film ONy/25 μm thick layer of resin blend of polyethylene T-LLDPE and polyethylene HPLD/30 μm thick layer of polyethylene M-LLDPE.

The above extrusion lamination was performed by means of a laminator equipped with an extruder of 65 mm diameter and a T-die of 500 mm width under such conditions that the take-off speed, die lower resin temperature and air gap were 80 m/min, 315° C. and 130 mm, respectively.

With respect to the thus obtained extrusion laminated film, the heat seal strength and low-temperature heat sealing properties of polyethylene M-LLDPE layers and the surface oxygen concentration of polyethylene M-LLDPE layer were measured and evaluated by the above methods.

The results are given in Table 1.

A urethane anchor coating agent (hereinafter referred to as "agent AC") was applied onto 12 μm thick polyethylene terephthalate film (trade name: Lumirror, produced by Toray Industries, Inc.; hereinafter referred to as "film PET"), and the solvent thereof was evaporated off. A sandwich lamination of the above polyethylene M-LLDPE was performed at a thickness of 30 μm together with a laminated film consisting of: paper layer/20 μm thick layer of polyethylene HPLDPE/9 μm thick layer of aluminum as a sandwich film, so that an extrusion laminated film consisting of: paper layer/20 μm thick layer of polyethylene HPLDPE/9 μm thick layer of aluminum/30 μm thick layer of polyethylene M-LLDPE/agent AC/12 μm thick layer of film PET was produced.

The above sandwich lamination was performed by means of a laminator equipped with an extruder of 65 mm diameter and a T-die of 500 mm width under such conditions that the take-off speed, die lower resin temperature and air gap were 80 m/min, 315° C. and 130 mm, respectively.

With respect to the thus obtained laminated film, the interlayer bond strength between the aluminum and the polyethylene M-LLDPE was measured by the above method.

The results are given in Table 1.

Example 2

An extrusion laminated film consisting of: 15 μm thick layer of film ONy/25 μm thick layer of resin blend of polyethylene T-LLDPE and polyethylene HPLDPE/30 μm thick layer of polyethylene M-LLDPE, and an extrusion laminated film consisting of: paper layer/20 μm thick layer of polyethylene HPLDPE/9 μm thick layer of aluminum/30 μm thick layer of polyethylene M-LLDPE/agent AC/12 μm thick layer of film PET were produced in the same manner as in Example 1 except that the air gap was adjusted to 200 mm. With respect to the thus obtained extrusion laminated films, the heat seal strength and low-temperature heat sealing properties of polyethylene M-LLDPE layers, the surface oxygen concentration of polyethylene M-LLDPE layer and the interlayer bond strength between the aluminum and the polyethylene M-LLDPE were measured and evaluated by the above methods.

The results are given in Table 1.

Example 3

An extrusion laminated film consisting of: 15 μm thick layer of film ONy/25 μm thick layer of resin blend of polyethylene T-LLDPE and polyethylene HPLDPE/20 μm thick layer of polyethylene M-LLDPE, and an extrusion laminated film consisting of: paper layer/20 μm thick layer of polyethylene HPLDPE/9 μm thick layer of aluminum/20 μm thick layer of polyethylene M-LLDPE/agent AC/12 μm thick layer of film PET were produced in the same manner as in Example 1 except that the thickness of the layer of polyethylene M-LLDPE was 20 μm. With respect to the thus obtained extrusion laminated films, the heat seal strength and low-temperature heat sealing properties of polyethylene M-LLDPE layers, the surface oxygen concentration of polyethylene M-LLDPE layer and the interlayer bond strength between the aluminum and the polyethylene M-LLDPE were measured by the above methods.

The results are given in Table 1.

Comparative Example 1

An extrusion laminated film consisting of: 15 μm thick layer of film ONy/25 μm thick layer of resin blend of polyethylene T-LLDPE and polyethylene HPLDPE/30 μm thick layer of polyethylene M-LLDPE, and an extrusion laminated film consisting of: paper layer/20 μm thick layer of polyethylene HPLDPE/9 μm thick layer of aluminum/30 μm thick layer of polyethylene M-LLDPE/agent AC/12 μm thick layer of film PET were produced in the same manner as in Example 1 except that the laminating resin temperature for the formation of the layer of polyethylene M-LLDPE was 305° C. With respect to the thus obtained extrusion laminated films, the heat seal strength and low-temperature heat sealing properties of polyethylene M-LLDPE layers, the surface oxygen concentration of polyethylene M-LLDPE layer and the interlayer bond strength between the aluminum and the polyethylene M-LLDPE were measured and evaluated by the above methods.

The results are given in Table 1.

Comparative Example 2

An extrusion laminated film consisting of: 15 μm thick layer of film ONy/25 μm thick layer of resin blend of polyethylene T-LLDPE and polyethylene HPLDPE/30 μm thick layer of polyethylene M-LLDPE, and an extrusion laminated film consisting of: paper layer/20 μm thick layer of polyethylene HPLDPE/9 μm thick layer of aluminum/30 μm thick layer of polyethylene M-LLDPE/agent AC/12 μm thick layer of film PET were produced in the same manner as in Example 1 except that the laminating resin temperature for the formation of the layer of polyethylene M-LLDPE was 325° C. With respect to the thus obtained extrusion laminated films, the heat seal strength and low-temperature heat sealing properties of polyethylene M-LLDPE layers, the surface oxygen concentration of polyethylene M-LLDPE layer and the interlayer bond strength between the aluminum and the polyethylene M-LLDPE were measured and evaluated by the above methods.

The results are given in Table 1.

Comparative Example 3

An extrusion laminated film consisting of: 15 μm thick layer of film ONy/25 μm thick layer of resin blend of polyethylene T-LLDPE and polyethylene HPLDPE/30 μm thick layer of polyethylene HPLDPE, and an extrusion laminated film consisting of: paper layer/20 μm thick layer of polyethylene HPLDPE/9 μm thick layer of aluminum/30 μm thick layer of polyethylene HPLDPE/agent AC/12 μm thick layer of film PET were produced in the same manner as in Example 1 except that the layer of polyethylene M-LLDPE was changed to a layer of polyethylene HPLD and that the laminating resin temperature for the formation thereof was 320° C. With respect to the thus obtained extrusion laminated films, the heat seal strength and low-temperature heat sealing properties of polyethylene HPLDPE layers, the surface oxygen concentration of polyethylene HPLDPE layer and the interlayer bond strength between the aluminum and the polyethylene HPLDPE were measured and evaluated by the above methods.

The results are given in Table 1.

Comparative Example 4

An extrusion laminated film consisting of: 15 μm thick layer of film ONy/25 μm thick layer of resin blend of polyethylene T-LLDPE and polyethylene HPLDPE/30 μm thick layer of ionomer resin, and an extrusion laminated film consisting of: paper layer/20 μm thick layer of polyethylene HPLDPE/9 μm thick layer of aluminum/30 μm thick layer of ionomer resin/agent AC/12 μm thick layer of film PET were produced in the same manner as in Example 1 except that the layer of polyethylene M-LLDPE was changed to a layer of ionomer resin (trade name: Himilan H1652, produced by Mitsui DuPont Polychemical Co., Ltd.) and that the laminating resin temperature for the formation thereof was 290° C. With respect to the thus obtained extrusion laminated films, the heat seal strength and low-temperature heat sealing properties of ionomer resin layers and the interlayer bond strength between the aluminum and the ionomer resin were measured and evaluated by the above methods.

The results are given in Table 1.

Comparative Example 5

An extrusion laminated film consisting of: 15 μm thick layer of film ONy/25 μm thick layer of resin blend of polyethylene T-LLDPE and polyethylene HPLDPE/30 μm thick layer of copolymer EMAA, and an extrusion laminated film consisting of: paper layer/20 μm thick layer of polyethylene HPLDPE/9 μm thick layer of aluminum/30 μm thick layer of copolymer EMAA/agent AC/12 μm thick layer of film PET were produced in the same manner as in Example 1 except that the layer of polyethylene M-LLDPE was changed to a layer of ethylene/methacrylic acid copolymer (herein referred to as "copolymer EMAA") (trade name: Nucrel N0908C, produced by Mitsui DuPont Polychemical Co., Ltd.) and that the laminating resin temperature for the formation thereof was 280° C. With respect to the thus obtained extrusion laminated films, the heat seal strength and low-temperature heat sealing properties of copolymer EMAA layers and the interlayer bond strength between the aluminum and the copolymer EMAA were measured and evaluated by the above methods.

The results are given in Table 1.

TABLE 1

| | Ex. 1 | Ex. 2 | Ex. 3 | Comp. Ex. 1 |
|---|---|---|---|---|
| Sealant layer | M-LLDPE | M-LLDPE | M-LLDPE | M-LLDPE |
| Sealant layer laminating condition | | | | |
| laminating resin temp. [° C.] | 315 | 315 | 315 | 305 |
| coat thickness [μm] | 30 | 30 | 20 | 30 |
| air gap [mm] | 130 | 200 | 130 | 130 |
| Heat seal strength [N/15 mm] | | | | |
| seal temp. 90° C. | 11.4 | 10.0 | 10.4 | 11.8 |
| 95° C. | 20.5 | 17.9 | 19.5 | 22.9 |
| 100° C. | 30.3 | 26.5 | 29.3 | 34.5 |
| 105° C. | 33.4 | 29.2 | 30.5 | 44.7 |
| 110° C. | 45.1 | 42.7 | 44.4 | 57.6 |
| 120° C. | 50.7 | 49.8 | 50.5 | 64.7 |
| 130° C. | 50.4 | 50.3 | 50.6 | 66.5 |
| 140° C. | 50.8 | 50.5 | 50.2 | 65.0 |
| Heat seal starting temp. [° C.] | 110 | 110 | 110 | 110 |
| Surface oxygen concn. of M-LLDPE layer [atom %] | 1.2 | 1.4 | 1.3 | 0.9 |
| Bond strength to Al [N/15 mm] | 1.8 | 1.6 | 1.8 | <0.1 |

| | Comp. Ex. 2 | Comp. Ex. 3 | Comp. Ex. 4 | Comp. Ex. 5 |
|---|---|---|---|---|
| Sealant layer Sealant layer | M-LLDPE | HPLD | ionomer resin | EMAA |

TABLE 1-continued

| laminating condition | | | | |
|---|---|---|---|---|
| laminating resin temp. [° C.] | 325 | 320 | 290 | 280 |
| coat thickness [μm] | 30 | 30 | | |
| air gap [mm] | 130 | 130 | | |
| Heat seal strength [N/15 mm] | | | | |
| seal temp. 90° C. | 6.6 | 1.1 | 3.8 | 1.2 |
| 95° C. | 12.6 | 1.2 | 4.7 | 3.7 |
| 100° C. | 15.8 | 1.2 | 10.2 | 8.3 |
| 105° C. | 19.0 | 3.5 | 23.2 | 19.5 |
| 110° C. | 24.4 | 15.0 | 29.3 | 29.3 |
| 120° C. | 23.6 | 27.1 | 34.4 | 39.8 |
| 130° C. | 23.9 | 31.5 | 34.1 | 39.8 |
| 140° C. | 26.7 | 32.0 | 33.7 | 37.9 |
| Heat seal starting temp. [° C.] | >140 | 120 | 110 | 115 |
| Surface oxygen concn. of M-LLDPE layer [atom %] | 1.5 | — | — | — |
| Bond strength to Al [N/15 mm] | 3.0 | 1.5 | 4.9 | 5.3 |

(Note) M-LLDPE:
LLDPE prepd. using metallocene olefin polymn. catalyst
HPLDPE:
high-pressure-processed low-density polyethylene
EMMA:
ethylene/metacrylic acid copolymer Upon comparison of the heat sealing properties of polyethylene M-LLDPE layers of the extrusion laminated film of Example 1 in which the production was performed with the resin temperature of polyethylene M-LLDPE regulated to 315° C. to the heat sealing properties of ionomer resin layers of the extrusion laminated film with similar structure of Comparative Example 4 in which the production was performed with the resin temperature of ionomer resin regulated to 290° C., it was found that, although the low-temperature heat sealing properties were similar, the heat seal strength (110° C.) of the former was 1.5 times that of the latter.

Likewise, upon comparison of the heat sealing properties of polyethylene M-LLDPE layers of the extrusion laminated film of Example 1 to the heat sealing properties of copolymer EMAA layers of the extrusion laminated film of Comparative Example 5 in which the production was performed with the resin temperature of copolymer EMAA regulated to 280° C., it was found that the low-temperature heat sealing properties of the former were 5° C. lower than those of the latter and the heat seal strength (120° C.) of the former was 1.3 times that of the latter.

In these Examples, the bond strength to the aluminum layer was practically satisfactory although it decreased. On the other hand, the bonding of polyethylene M-LLDPE layers was extremely enhanced to thereby render the overall evaluation as packaging material excellent.

Example 4

Production of ethylene/1-hexene copolymer (linear low-density polyethylene)

[Preparation of catalyst component]

7.9 g of silica dried at 250° C. for 10 hr was suspended in 121 lit. of toluene and cooled to 0° C. Thereafter, 41 lit. of a toluene solution of methylaluminooxane (Al: 1.47 mol/lit.) was dropped into the suspension over a period of 1 hr. During the dropping, the temperature of the reaction system was maintained at 0° C. The reaction between silica and methylaluminooxane was performed at 0° C. for 30 min, and the temperature was raised to 95° C. over a period of 1.5 hr. At that temperature, the reaction was performed for 4 hr. Thereafter, the temperature was lowered to 60° C., and the supernatant was removed by decantation. The thus obtained solid component was washed with toluene twice and resuspended in 125 lit. of toluene. 20 lit. of a toluene solution of bis(1,3-dimethylcyclopentadienyl)zirconium dichloride (Zr: 28.4 mmol/lit.) was dropped into the suspension at 30° C. over a period of 30 min and reacted at 30° C. for 2 hr. The supernatant was removed, and washing was performed with hexane twice. Thus, there was obtained a solid catalyst containing 4.6 mg of zirconium per g.

[Preparation of prepolymerized catalyst]

4.3 kg of the thus obtained solid catalyst was added to 160 lit. of hexane containing 16 mol of triisobutylaluminum, and a prepolymerization of ethylene was performed at 35° C. for 3.5 hr. Thus, there was obtained a prepolymerized catalyst having 3 g of polyethylene produced by prepolymerization per g of the solid catalyst. The intrinsic viscosity [η], measured in 135° C. decalin, of the ethylene polymer was 1.27 dl/g.

[Polymerization]

Copolymerization of ethylene and 1-hexene was performed by means of a continuous fluid-bed gaseous-phase polymerization apparatus under such conditions that the total pressure and polymerization temperature were 20 kg/cm$^2$-G and 80° C., respectively. The above prepolymerized catalyst was continuously fed into the apparatus at a rate of 0.05 mmol/hr in terms of zirconium atom, and triisobutylaluminum at a rate of 10 mmol/hr, and ethylene, 1-hexene, hydrogen and nitrogen were also continuously fed into the apparatus so that a constant gas composition was maintained during the polymerization.

With respect to the thus obtained ethylene/α-olefin copolymer (M-LLDPE-2), the yield, density, MFR, melting point maximum peak measured by DSC and n-decane soluble content at 23° C. were 5.2 kg/hr, 0.900 g/cm$^3$, 5.6 g/10 min, 102.8.0° C. and 0.82% by weight, respectively.

TABLE 2

| | Comonomer | | | MFR | | |
|---|---|---|---|---|---|---|
| Ethylene copolymer | type | Content mol % | Density g/cm$^3$ | g/10 min | MT g | *1 |
| M-LLDPE-2 | 1-hexene | 6.7 | 0.900 | 5.6 | 1.6 | 0.51 |

| Ethylene copolymer | FI S$^{-1}$ | *2 | n-decane soluble content wt % | *3 | Tm ° C. | *4 |
|---|---|---|---|---|---|---|
| LLDPE-2 | 820 | 420 | 0.82 | 10.9 | 102.8 | 110.0 |

*1: value of 2.2 × MFR$^{-0.84}$
*2: value of 75 × MFR
*3: value of 80 × exp(−100(d − 0.88)) + 0.1
*4: value of 400 × d − 250

The procedure of Example 1 was repeated except that the above-obtained ethylene/1-hexene copolymer (M-LLDPE-2) was used in place of the linear low-density polyethylene M-LLDPE, to thereby obtain an extrusion laminated film consisting of: 15 μm thick layer of film ONy/25 μm thick layer of resin blend of polyethylene T-LLDPE and polyethylene HPLDPE/30 μm thick layer of polyethylene M-LLDPE-2 and an extrusion laminated film consisting of: paper layer/20 μm thick layer of polyethylene HPLDPE/9 μm thick layer of aluminum/30 μm thick layer of polyethylene M-LLDPE-2/agent AC/12 μm thick layer of film PET.

With respect to the thus obtained laminated films, the heat seal strength, low-temperature heat sealing properties of polyethylene M-LLDPE-2 layers, the surface oxygen concentration of polyethylene M-LLDPE-2 layer and the interlayer bond strength between the aluminum and the polyethylene M-LLDPE-2 were measured by the above method.

The results are given in Table 3.

Example 5

The procedure of Example 1 was repeated except that the above-obtained ethylene/1-hexene copolymer (M-LLDPE-2) was used in place of the linear low-density polyethylene M-LLDPE, to thereby obtain an extrusion laminated film consisting of: 30 μm thick layer of polyethylene M-LLDPE-2/9 μm thick layer of aluminum/15 μm thick layer of film ONy.

With respect to the thus obtained laminated films, the heat seal strength, low-temperature heat sealing properties of polyethylene M-LLDPE layers, the surface oxygen concentration of polyethylene M-LLDPE-2 layer and the interlayer bond strength between the aluminum and the polyethylene M-LLDPE-2 were measured by the above method.

The results are given in Table 3.

Example 6

The procedure of Example 1 was repeated except that the above-obtained ethylene1-hexene copolymer (M-LLDPE-2) was used in place of the linear low-density polyethylene M-LLDPE, to thereby obtain an extrusion laminated film consisting of: 30 μm thick layer of polyethylene M-LLDPE-2/9 μm thick layer of aluminum/20 μm thick layer of HPLDPE/15 μm thick layer of film ONy.

With respect to the thus obtained laminated films, the heat seal strength, low-temperature heat sealing properties of polyethylene M-LLDPE layers, the surface oxygen concentration of polyethylene M-LLDPE-2 layer and the interlayer bond strength between the aluminum and the polyethylene M-LLDPE-2 were measured by the above method.

The results are given in Table 3.

Comparative Example 6

The procedure of Example 6 was repeated except that the polyethylene HPLDPE was used in place of ethylene/1-hexene copolymer (M-LLDPE-2), to thereby obtain an extrusion laminated film consisting of: 30 μm thick layer of polyethylene HDLDPE/9 μm thick layer of aluminum/20 μm thick layer of HPLDPE/15 μm thick of film ONy.

With respect to the thus obtained laminated films, the heat seal strength, low-temperature heat sealing properties of polyethylene HPLDPE layers and the surface oxygen concentration of polyethylene HPLDPE layer the interlayer bond strength between the aluminum and the polyethylene HPLDPE were measured by the above method.

Example 7

The procedure of Example 1 was repeated except that the above-obtained ethylene/1-hexene copolymer (M-LLDPE-2) was used in place of the linear low-density polyethylene M-LLDPE, to thereby obtain an extrusion laminated film consisting of: 30 μm thick layer of polyethylene M-LLDPE-2/9 μm thick layer of aluminum/12 μm thick layer of PET/20 μm thick layer of HPLDPE/15 μm thick layer of film ONy.

With respect to the thus obtained laminated films, the heat seal strength, low-temperature heat sealing properties of polyethylene M-LLDPE layers the surface oxygen concentration of polyethylene M-LLDPE-2 layer and the interlayer bond strength between the aluminum and the polyethylene M-LLDPE-2 were measured by the above method.

The results are given in Table 3.

TABLE 3

| | Ex. 4 | Ex. 5 | Ex. 6 |
|---|---|---|---|
| Sealant layer | M-LLDPE-2 | M-LLDPE-2 | M-LLDPE-2 |
| Sealant layer laminating condition | | | |
| laminating resin temp. [° C.] | 315 | 315 | 315 |
| coat thickness [μm] | 30 | 30 | 30 |
| air gap [mm] | 130 | 130 | 130 |
| Heat seal strength [N/15 mm] | | | |
| seal temp. 90° C. | 10.4 | 11.8 | 9.9 |
| 95° C. | 21.1 | 22.4 | 21.0 |
| 100° C. | 30.8 | 33.5 | 31.0 |
| 105° C. | 35.7 | 41.8 | 36.1 |
| 110° C. | 43.9 | 44.0 | 42.7 |
| 120° C. | 50.8 | 45.5 | 45.1 |
| 130° C. | 50.0 | 45.1 | 45.5 |
| 140° C. | 51.2 | 44.8 | 45.6 |
| Heat seal starting temp. [° C.] | 110 | 105 | 110 |
| Surface oxygen concn. of M-LLDPE-2 layer [atom %] | 1.3 | 1.3 | 1.2 |
| Bond strength to Al [N/15 mm] | 1.9 | 2.1 | 2.0 |

| | Comp. Ex.6 | Ex.7 |
|---|---|---|
| Sealant layer | HPLDPE | M-LLDPE-2 |
| Sealant layer laminating condition | | |
| laminating resin temp. [° C.] | 320 | 315 |
| coat thickness [μm] | 30 | 30 |
| air gap [mm] | 130 | 130 |
| Heat seal strength [N/15 mm] | | |
| seal temp. 90° C. | 1.0 | 4.3 |
| 95° C. | 1.1 | 11.3 |
| 100° C. | 1.2 | 18.9 |
| 105° C. | 1.4 | 31.2 |
| 110° C. | 6.5 | 40.5 |
| 120° C. | 21.1 | 45.5 |
| 130° C. | 30.2 | 44.8 |
| 140° C. | 31.8 | 45.2 |
| Heat seal starting temp. [° C.] | 130 | 110 |
| Surface oxygen concn. of M-LLDPE-2 layer [atom %] | — | 1.2 |
| Bond strength to Al [N/15 mm] | 1.9 | 2.1 |

(Note) M-LLDPE-2:
LLDPE prepd. using metallocene olefin polymn. catalyst
HPLDPE:
high-pressure-processed low-density polyethylene

What is claimed is:

1. A laminated film comprising at least an aluminum layer (A) and, superimposed on one side thereof by extrusion lamination, a linear low-density polyethylene layer (B), said linear low-density polyethylene layer (B) prepared with the use of metallocene olefin polymerization catalyst and having (i) a density (d), measured in accordance with ASTM D 1505, of 0.895 to 0.930 g/cm³ and (ii) a melt flow rate (MFR), measured at 190° C. under a load of 2.16 kg in accordance with ASTM D 1238, of 0.1 to 100 g/ 10 min, wherein the linear low-density polyethylene layer (B) at its surface exhibits an oxygen concentration of linear low-density polyethylene ranging from 1.0 to 1.4 atomic %.

2. The laminated film as claimed in claim 1, wherein the linear low-density polyethylene constituting the linear low-density polyethylene layer (B) is a copolymer of ethylene and an α-olefin having:

(iii) a melt flow rate (MFR, g/10 min) and a melt tension (MT, g) measured at 190° C., which satisfy the relationship:

$MT > 2.0 \times MFR^{-0.84}$;

(iv) a fluidity index (FI, 1/sec) defined as a shearing rate exhibited when the shearing stress of molten polymer at 190° C. has reached $2.4 \times 10^6$ dyne/cm$^2$, the fluidity index and the melt flow rate (MFR, g/10 min) satisfying the relationship:

$FI > 75 \times MFR$;

(v) a n-decane soluble content (W, wt. %) measured at 23° C., the n-decane soluble content and the density (d, g/cm$^3$) satisfying the relationship:

when $MFR \leq 10$ g/10 min, $W < 80 \times \exp(-100(d-0.88)) + 0.1$, and when $MFR > 10$ g/10 min, $W < 80 \times (MFR-9)^{0.26} \times \exp(-100(d-0.88)) + 0.1$;

and (vi) a temperature exhibited at the maximum peak of endothermic curve obtained by a differential scanning calorimeter (Tm, ° C.), the temperature and the density (d, g/cm$^3$) satisfying the relationship:

$Tm < 400d - 250$.

3. The laminated film as claimed in claim 2, wherein:
(iii) the melt flow rate (MFR, g/10 min) and melt tension (MT, g) measured at 190° C. satisfy the relationship:

$MT > 2.2 \times MFR^{-0.84}$.

4. The laminated film as claimed in claim 1, wherein a substrate layer (C) is further superimposed on the opposite side of the aluminum layer (A) remote from the linear low-density polyethylene layer (B).

5. The laminated film as claimed in claim 1, wherein a polyethylene layer (D) and a substrate layer (C) in this order are further superimposed on the opposite side of the aluminum layer (A) remote from the linear low-density polyethylene layer (B).

6. The laminated film as claimed in claim 1, wherein a first polyethylene layer (D) and a substrate layer (C) in this order are further superimposed on the opposite side of the aluminum layer (A) remote from the linear low-density polyethylene layer (B) and wherein a second polyethylene layer (D) is further superimposed on the linear low-density polyethylene layer (B).

7. The laminated film as claimed in claim 1, wherein a first substrate layer (C), a polyethylene layer (D) and a second substrate layer (C) in this order are further superimposed on the opposite side of the aluminum layer (A) remote from the linear low-density polyethylene layer (B).

8. The laminated film as claimed in claim 1, wherein the aluminum layer (A) is an aluminum foil or an aluminum vapor deposition film.

9. The laminated film as claimed in claim 4, wherein the substrate layer (C) is composed of paper, a polyamide film, a polyester film or a polypropylene film.

10. The laminated film as claimed in claim 5, wherein the polyethylene layer (D) is composed of a high-pressure-processed low-density polyethylene, a linear low-density polyethylene or a mixture thereof.

* * * * *